(12) United States Patent
Kim et al.

(10) Patent No.: US 11,586,097 B2
(45) Date of Patent: Feb. 21, 2023

(54) CAMERA MODULE

(71) Applicant: Samsung Electro-Mechanics Co., Ltd, Suwon-si (KR)

(72) Inventors: Yoo Chang Kim, Suwon-si (KR); Sung Hoon Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 17/346,523

(22) Filed: Jun. 14, 2021

(65) Prior Publication Data

US 2022/0066290 A1   Mar. 3, 2022

(30) Foreign Application Priority Data

Sep. 2, 2020   (KR) .......................... 10-2020-0111466

(51) Int. Cl.
*G03B 17/12* (2021.01)
*G02B 7/09* (2021.01)
*G02B 7/02* (2021.01)

(52) U.S. Cl.
CPC ............ *G03B 17/12* (2013.01); *G02B 7/022* (2013.01); *G02B 7/09* (2013.01); *G03B 2205/0053* (2013.01)

(58) Field of Classification Search
CPC ............ G03B 17/12; G03B 2205/0053; G03B 13/36; G03B 2205/0007; G03B 2205/0069; G02B 7/022; G02B 7/09
See application file for complete search history.

(56) References Cited

U.S. PATENT DOCUMENTS

2011/0026915 A1    2/2011   Baik et al.
2021/0247038 A1*   8/2021   Zhang ................... F21V 29/56

FOREIGN PATENT DOCUMENTS

| KR | 10-2011-0011192 A | 2/2011 |
| KR | 10-1270656 B1 | 6/2013 |
| KR | 10-2015-0085426 A | 7/2015 |
| KR | 10-2015-0096959 A | 8/2015 |
| KR | 10-2016-0032070 A | 3/2016 |

OTHER PUBLICATIONS

Korean Notice of Reason for Rejection dated Sep. 26, 2021 in corresponding Korean Patent Application No. 10-2020-0111466. (8 pages in English and 6 pages in Korean).

* cited by examiner

*Primary Examiner* — Antoinette T Spinks
(74) *Attorney, Agent, or Firm* — NSIP Law

(57) ABSTRACT

A camera module includes a lens barrel, a housing, a shield cover, and a buffer member. The lens barrel incudes a flange portion extending in a direction intersecting an optical axis. The housing is configured to accommodate the lens barrel and has a step portion configured to face a lower portion of the flange portion. The shield cover is coupled to the housing and configured to cover an upper edge of the lens barrel. The buffer member is configured to couple to a groove of the flange portion and protrude in opposing directions from the flange portion to selectively contact the shield cover and the step portion.

16 Claims, 14 Drawing Sheets

CAMERA MODULE

CROSS-REFERENCE TO RELATED APPLICATION

This application claims the benefit under 35 USC 119(a) of Korean Patent Application No. 10-2020-0111466 filed on Sep. 2, 2020 in the Korean Intellectual Property Office, the entire disclosure of which is incorporated herein by reference for all purposes.

BACKGROUND

1. Field

The following description relates to a camera module.

2. Description of Related Art

Camera modules include lens modules configured to accommodate lenses. A lens module is configured to be movable inside a camera module to enable autofocusing (AF) or optical image stabilization (OIS) of the camera module. For example, the lens module may move in the optical axis direction or in a direction intersecting the optical axis within the housing of the camera module. In the related art, the movement of the lens module is controlled by the camera module. However, since the movement of the lens module due to external forces (for example, when the user quickly walks or runs while holding a mobile terminal equipped with a camera module) is not controlled by the camera module, collisions and collision noise between the lens module and other members of the camera module are generated.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel, a housing, a shield cover, and a buffer member. The lens barrel incudes a flange portion extending in a direction intersecting an optical axis. The housing is configured to accommodate the lens barrel and has a step portion configured to face a lower portion of the flange portion. The shield cover is coupled to the housing and configured to cover an upper edge of the lens barrel. The buffer member is configured to couple to a groove of the flange portion and protrude in opposing directions from the flange portion to selectively contact the shield cover and the step portion.

The shield cover may include a protrusion extending towards the buffer member.

The camera module may further include a driving assembly configured to drive the lens barrel in the optical axis direction.

The driving assembly may include a driving magnet disposed on the lens barrel, and a driving coil disposed in the housing.

The camera module may further include a reinforcing member integrally configured with the flange portion and have a hole into which the buffer member is to be inserted.

The reinforcing member may be formed of a material different from a material of the lens barrel.

The buffer member may include a first buffer portion configured to contact the shield cover, a second buffer portion configured to contact the step portion, and a connection portion disposed between the first buffer portion and the second buffer portion and configured to fit into the groove.

The shield cover may be formed of metal.

In another general aspect, a camera module includes a lens barrel configured to receive a lens, a barrel holder, a housing, a shield cover, and a buffer member. The barrel holder is coupled to the lens barrel and including a flange portion extending to intersect an optical axis. The housing, configured to accommodate the lens barrel and the barrel holder, is provided with a step portion configured to face the flange portion. The shield cover is coupled to the housing and configured to cover an upper edge of the lens barrel. The buffer member is fitted into a groove of the flange portion and configured to contact the step portion or the shield cover.

The camera module may further include a driving assembly configured to drive the lens barrel and the barrel holder in the optical axis direction.

The driving assembly may include a driving magnet disposed on the barrel holder, and a driving coil disposed in the housing.

The camera module may further include a guide groove of the lens barrel and a guide groove of the housing provided with a ball bearing disposed therebetween.

The shield cover may include a protrusion protruding towards the buffer member.

The buffer member may include a first buffer portion configured to contact the shield cover, a second buffer portion configured to contact the step portion, and a connection portion disposed between the first buffer portion and the second buffer portion and configured to fit into the groove.

The flange portion may be provided with a reinforcing member integrally configured with the flange portion and have a hole into which the buffer member is to be inserted.

The reinforcing member may be formed of a material different from a material of the barrel holder.

The shield cover may be formed of metal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
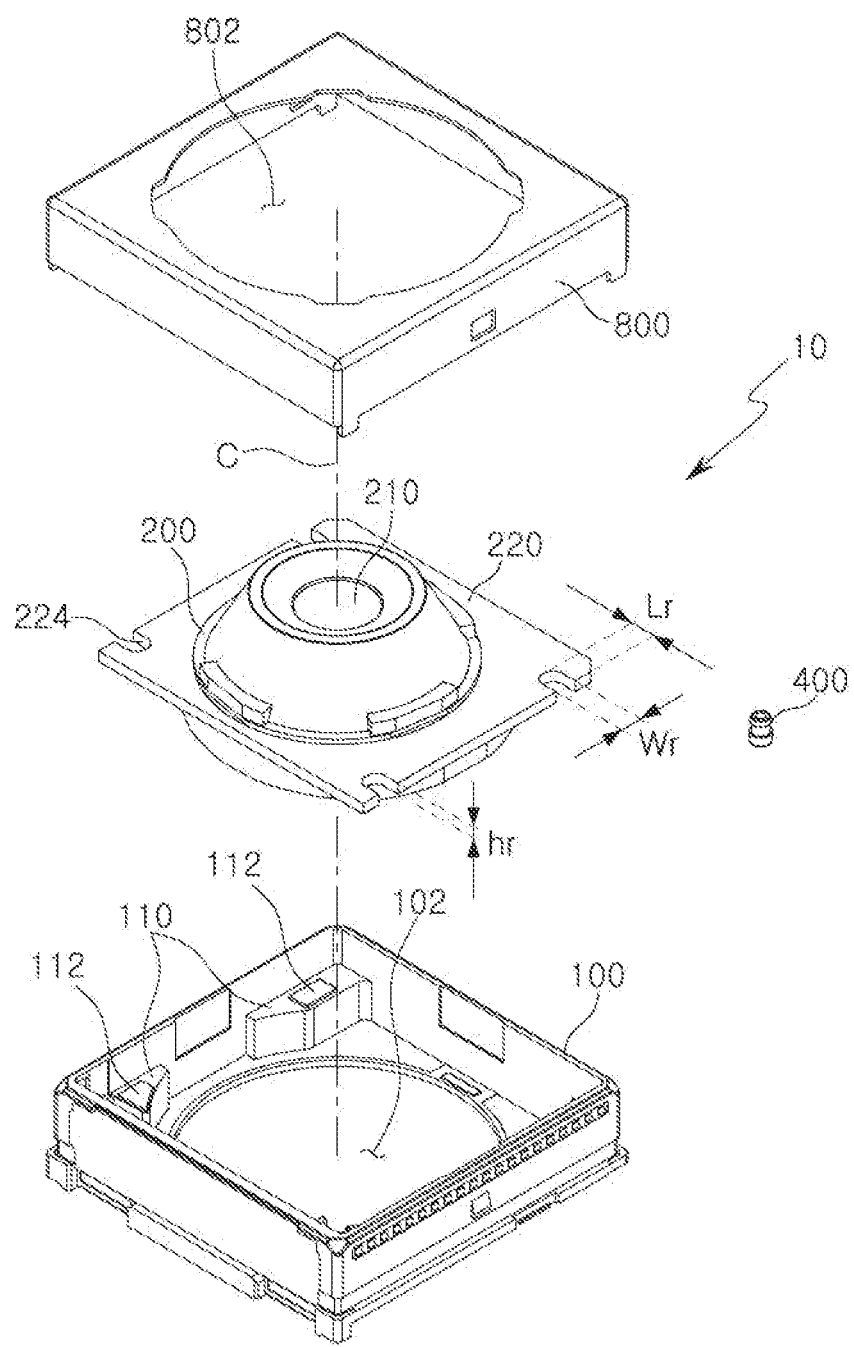
FIG. 1 is an exploded perspective view of a camera module, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways, as will be apparent after gaining an understanding of the disclosure of this application. Further, although the examples described herein have a variety of configurations, other configurations are possible, as will be apparent after gaining an understanding of the disclosure of this application.

The drawings may not be to scale, and the relative sizes, proportions, and depictions of elements in the drawings may be exaggerated for clarity, illustration, and convenience.

The camera module described herein may be mounted on a portable electronic product. For example, the camera module may be mounted on a portable telephone, a notebook computer, or the like. However, the range of use of the camera module is not limited to the aforementioned electronic products. For example, the camera module may be mounted on the front and rear surfaces of all electronic devices in which the camera module may be mounted.

The camera module includes a lens module. The lens module may move inside of the camera module to perform specific functions of the camera module. For example, the lens module may move in the optical axis direction. The lens module may be actively moved to perform unique functions of the camera module, but may also be moved passively by an external impact. For example, the lens module may shake in the optical axis direction within the camera module based on the type of activity the mobile terminal user partakes. Shaking of the lens module may cause noise and/or malfunctioning of the camera module. For example, a lens module shaking in the direction of the optical axis may collide with a shield cover, a housing, or a substrate of a camera module to generate annoying noise to the user's ears.

Examples provide a camera module configured to reduce malfunctioning and damage to a camera module due to collisions and collision noise of a lens module.

In one or more examples of the present disclosure to prevent the above-described problem, by integrally forming a buffer member on the flange portion of the lens module or the flange portion of the barrel holder, problems such as noise (impact sound) generated by shaking of the lens module, malfunctioning of the camera module, and the like may be prevented.

First, a camera module, according to an example, will be described with reference to FIGS. 1 to 4.

A camera module 10 may include a housing 100, a lens barrel 200, a buffer member 400, and a shield cover 800. However, the configuration of the camera module 10 is not limited to the aforementioned members. For example, the camera module 10 may further include a substrate 700 and an image sensor 720 (see FIG. 4).

The housing 100 is configured to accommodate a lens barrel 200. For example, the housing 100 may be configured in a form that is open in the vertical direction and of which the side surface is closed to accommodate the lens barrel 200. A window 102 having a predetermined size may be formed in the bottom surface of the housing 100. Light refracted by the lens barrel 200 may be incident on the image sensor through the window 102 described above. A step portion 110 for selectively contacting a flange portion 220 of the lens barrel 200 may be formed in the housing 100. The step portion 110 may be formed at four corners of the housing 100 so as not to interfere with the movement of the lens barrel 200 in the direction of an optical axis C. However, the formation position of the step portion 110 is not limited to the corner portion of the housing 100. For example, the step portion 110 may be formed on any portion of the housing 100 in a range that does not interfere with the movement of the lens barrel 200 in the optical axis (C) direction. For example, the step portion 110 may be formed on a sidewall of the housing 100. A shock-absorbing member 112 having a predetermined elasticity may be formed on the step portion 110. For example, the shock-absorbing member 112 may be formed of a material such as urethane foam, foamable resin, natural rubber, synthetic rubber, or the like, which is easily deformable by external impacts.

The lens barrel 200 may be configured to include one or more lenses 210. In a non-limiting example, the lens barrel 200 may include four or more lenses 210. However, the number of lenses 210 accommodated in the lens barrel 200 is not limited to four. The lens barrel 200 may be formed to have a substantially cylindrical shape to accommodate a plurality of circular lenses 210. However, the shape of the lens barrel 200 is not limited to a cylinder. For example, the shape of the lens barrel 200 may be modified according to the cross-sectional shape of the lens 210.

The lens barrel 200 may include a flange portion 220. For example, the flange portion 220 extending in a direction intersecting the optical axis C may be formed on a circumference of the lens barrel 200. The flange portion 220 may be formed to have substantially the same shape as the cross-sectional shape of the inner space of the housing 100. For example, the flange portion 220 may have a quadrangular shape similar to the inner space of the housing 100. A groove 224 may be formed in the flange portion 220. The groove 224 may extend in a direction intersecting the optical axis C. The groove 224 may be formed to be open in a lateral direction of the flange portion 220. The groove 224 may be formed to have a shape that gradually narrows from the outside of the flange portion 220 to the inside thereof (in the direction of the lens barrel 200). However, the groove 224 is not necessarily formed such that a width Wr of the groove 224 becomes narrower toward the inside. For example, the width Wr of the groove 224 may be formed to have the same size in the longitudinal direction of the groove 224. The groove 224 may be formed to have a considerable length Lr. For example, the length Lr of the groove 224 may be greater than the width Wr of the groove 224.

The buffer member 400 may be fitted into the flange portion 220 of the lens barrel 200. For example, the buffer member 400 may be fitted into the groove 224 of the flange portion 220. The buffer member 400 is configured to reduce impact energy between the lens barrel 200 and the housing 100 or the shield cover 800. For example, the buffer member 400 may reduce an impact applied to the lens barrel 200 by contacting the housing 100 or the shield cover 800 prior to the lens barrel 200. The buffer member 400 may be formed of a material capable of elastic deformation. For example, the buffer member 400 may be formed of a material such as urethane foam, foamable resin, natural rubber, synthetic rubber, or a synthetic material including the aforementioned material.

The shield cover 800 may be configured to cover at least a portion of the lens barrel 200. For example, the shield cover 800 may cover an upper edge of the lens barrel 200 so that the lens barrel 200 accommodated in the housing 100 is not separated toward the outside thereof. The shield cover 800 may be configured to protect the camera module 10 from external harmful electromagnetic waves. For example, the shield cover 800 may be formed of a metallic material or any other material suitable to block harmful electromagnetic waves.

Figure 2:
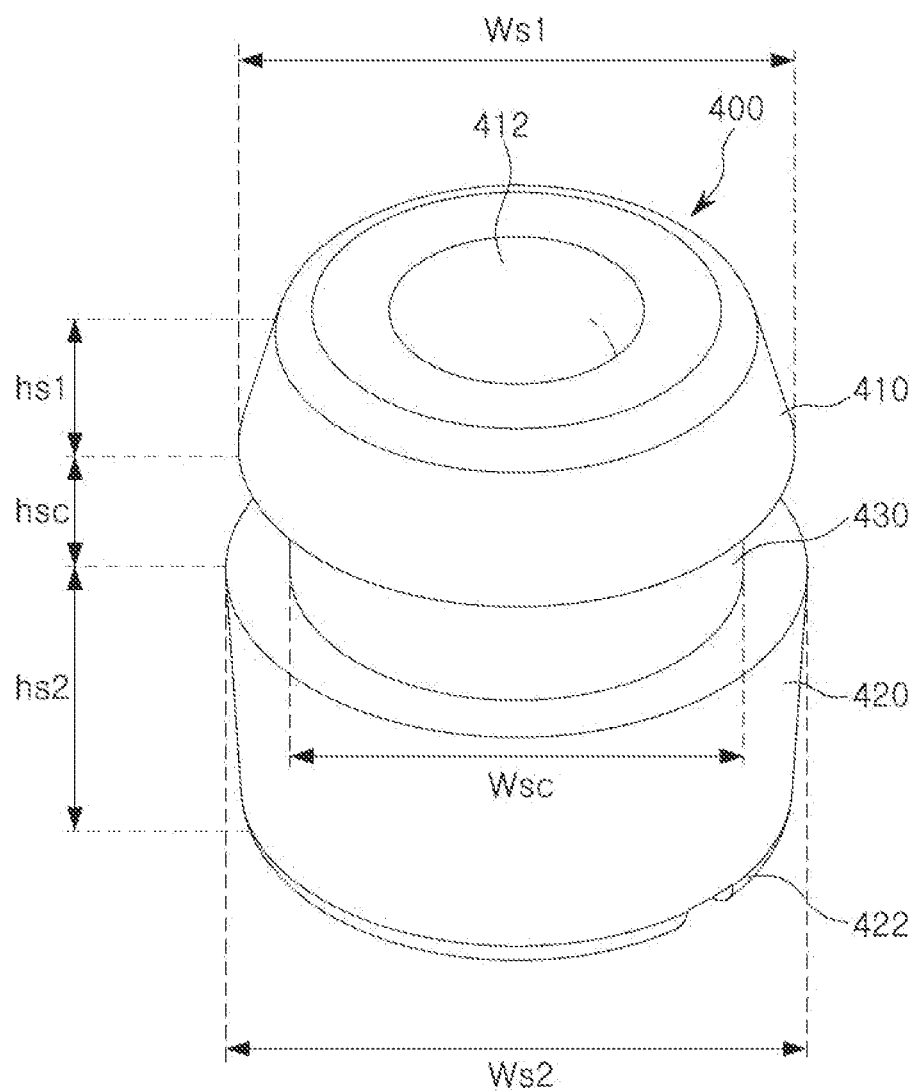
FIG. 2 is an enlarged perspective view of a buffer member illustrated in FIG. 1.

Next, the shape of the buffer member 400 will be described in detail with reference to FIG. 2.

The buffer member 400 may be formed to have a substantially cylindrical shape. In detail, the buffer member 400 may be formed in such a manner that a plurality of cylinders having different diameters may be stacked in the optical axis (C) direction. The buffer member 400 may be comprised of a first buffer portion 410, a second buffer portion 420, and a connection portion 430. The first buffer portion 410 may be configured to selectively contact the shield cover 800. For example, the first buffer portion 410 may be formed to protrude towards the shield cover 800 in a state in which the buffer member 400 is coupled to the flange portion 220. The second buffer portion 420 may be configured to selectively contact the step portion 110 of the housing 100. For example, the second buffer portion 420 may be formed to protrude toward the step portion 110 in a state in which the buffer member 400 is coupled to the flange portion 220. The connection portion 430 may connect the first buffer portion 410 and the second buffer portion 420.

The connection portion 430 may enable coupling between the buffer member 400 and the flange portion 220. For example, the buffer member 400 may be fitted into the groove 224 of the flange portion 220 via the connection portion 430. A width Wsc or a diameter of the connection portion 430 may be substantially the same as the width Wr of the groove 224. However, the width Wsc of the connection portion 430 is not necessarily the same as the width Wr of the groove 224. For example, the width Wsc of the connection portion 430 may be formed to be wider than the width Wr of the groove 224 in a range in which the buffer member 400 may be elastically deformed. Since the buffer member 400 having the above-described shape is coupled to the groove 224 of the flange portion 220 in a force-fit form, the coupling force thereof with the flange portion 220 may be improved.

A height hsc of the connection portion 430 may be greater than a height hr of the groove 224. However, the height hsc of the connection portion 430 does not necessarily have to be greater than the height hr of the groove 224. For example, the height hsc of the connection portion 430 may be formed to be lower than the height hr of the groove 224 in a range in which elastic deformation of the buffer member 400 is possible. Since the buffer member 400 of the above-described shape is coupled to the groove 224 of the flange portion 220 in a force-fit form, the coupling force thereof with the flange portion 220 may be improved.

Widths Ws1 and Ws2 or diameters of the first and second buffer portions 410 and 420 may be wider than the width Wsc of the connection portion 430 and the width Wr of the groove 224. Heights hs1 and hs2 of the first and second buffer portions 410 and 420 may be formed to have a considerable size. For example, the heights hs1 and hs2 of the first and second buffer portions 410 and 420 may be greater than the height hsc of the connection portion 430. However, the heights hs1 and hs2 of the first and second buffer portions 410 and 420 are not necessarily greater than the height hsc of the connection portion 430.

Protrusions 412 and 422 may be formed on the first and second buffer portions 410 and 420, respectively. The protrusions 412 and 422 may have a substantially hemispherical shape. However, the shape of the protrusions 412 and 422 is not limited to a hemisphere. For example, the protrusions 412 and 422 may be deformed in any shape within a range capable of absorbing impacts and elastic deformation.

Figure 3:
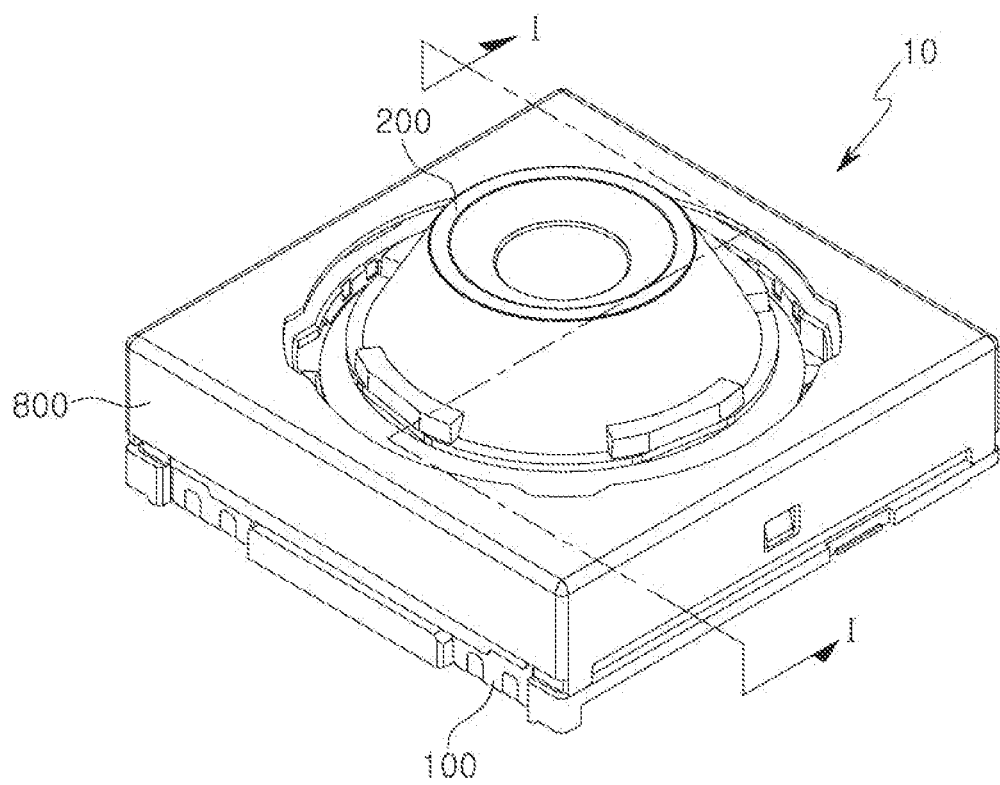
FIG. 3 is a combined perspective view of the camera module illustrated in FIG. 1.
Figure 4:
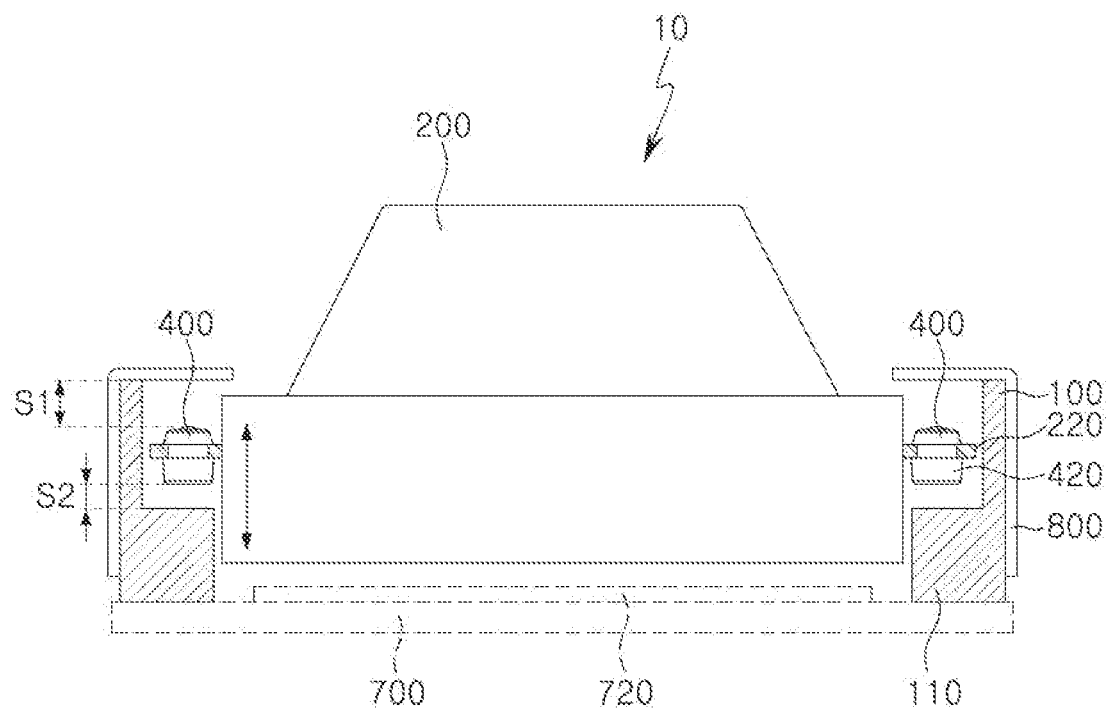
FIG. 4 is a cross-sectional view of the camera module illustrated in FIG. 3.
Figure 5:
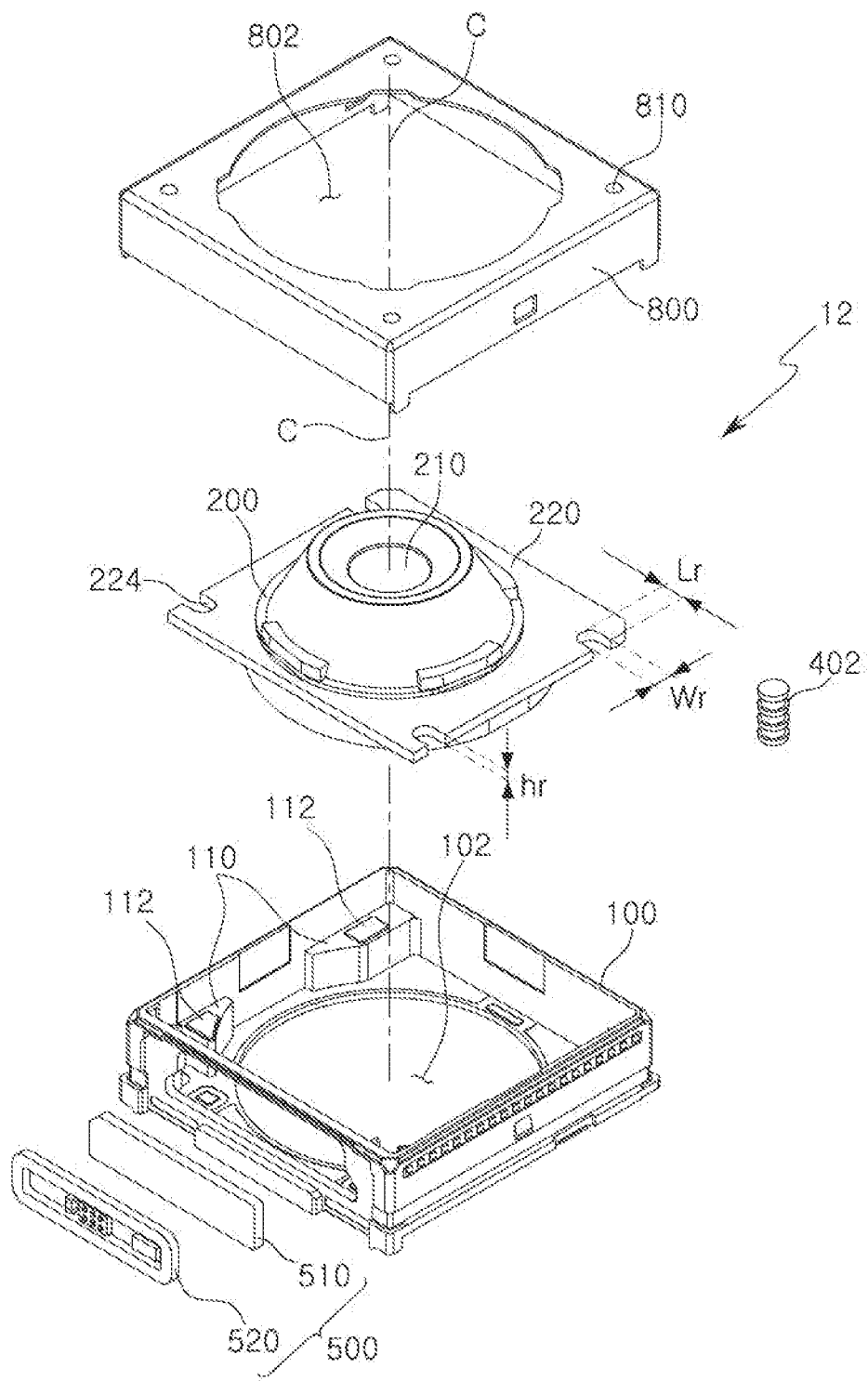
FIG. 5 is an exploded perspective view of a camera module, according to another example.

The camera module 10 has a relatively small size, as illustrated in FIG. 3, and thus, may be mounted on a small portable terminal such as a smartphone. In addition, the camera module 10 may significantly reduce noise and impacts caused by shaking of the lens barrel 200, as illustrated in FIG. 4. For example, the camera module 10 may reduce noise and impacts caused by shaking of the lens barrel 200 through the buffer member 400. The buffer member 400 may block direct contact between the lens barrel 200 and the housing 100 or the shield cover 800. For example, in an example in which the lens barrel 200 swings upwardly, the first buffer portion 410 contacts or collides with the shield cover 800 prior to the flange portion 220 of the lens barrel 200, resulting in reducing impact energy and collision noise. Similarly, in an example in which the lens barrel 200 swings downwardly, the second buffer portion 420 contacts and collides with the step portion 110 of the housing 100 prior to the flange portion 220 of the lens barrel 200, thereby reducing impact energy and collision noise. In addition, the buffer member 400 may significantly reduce a shaking displacement width of the lens barrel 200. For example, the first buffer portion 410 may reduce a clearance S1 between the shield cover 800 and the flange portion 220, and the second buffer portion 420 may reduce a clearance S2 between the housing 100 and the flange portion 220. Accordingly, the camera module 10 may reduce not only collision noise due to shaking of the lens barrel 200 but also a malfunction and failure of the camera module 10 due to severe vibration of the lens barrel 200.

Next, a camera module according to another example will be described with reference to FIGS. 5 to 8.

A camera module 12, according to an example, may include a housing 100, a lens barrel 200, a buffer member 402, a driving assembly 500, and a shield cover 800. However, the configuration of the camera module 12 is not limited to the aforementioned members. For example, the camera module 12 may further include a substrate 700 and an image sensor 720 (see FIG. 8).

The housing 100 is configured to accommodate the lens barrel 200. For example, the housing 100 may be configured in a form that is open in the vertical direction and of which the side surface is closed to accommodate the lens barrel 200. A window 102 having a predetermined size may be formed in the bottom surface of the housing 100. Light refracted by the lens barrel 200 may be incident on an image sensor through the window 102 described above. A step portion 110 for selectively contacting a flange portion 220 of the lens barrel 200 may be formed in the housing 100. The step portion 110 may be formed at four corners of the housing 100 so as not to interfere with the movement of the lens barrel 200 in the optical axis C direction. However, the formation position of the step portion 110 is not limited to the corner portion of the housing 100. For example, the step portion 110 may be formed on any portion of the housing 100 in a range that does not interfere with the movement of the lens barrel 200 in the optical axis (C) direction. For example, the step portion 110 may be formed on a sidewall of the housing 100. A shock-absorbing member 112 having a predetermined elasticity may be formed on the step portion 110. For example, the shock-absorbing member 112 may be formed of a material such as urethane foam, foamable resin, natural rubber, synthetic rubber, or the like, which is easily deformable by external impacts.

The lens barrel 200 may be configured to include one or more lenses 210. For example, the lens barrel 200 may include four or more lenses 210. However, the number of lenses 210 accommodated in the lens barrel 200 is not limited to four. The lens barrel 200 may be formed to have a substantially cylindrical shape to accommodate a plurality of circular lenses 210. However, the shape of the lens barrel 200 is not limited to a cylinder. For example, the shape of the lens barrel 200 may be modified according to the cross-sectional shape of the lens 210.

The lens barrel 200 may include a flange portion 220. For example, the flange portion 220 extending in a direction intersecting the optical axis C may be formed on a circumference of the lens barrel 200. The flange portion 220 may be formed to have substantially the same shape as the cross-sectional shape of the inner space of the housing 100. For example, the flange portion 220 may have a quadrangular shape similar to the inner space of the housing 100. A groove 224 may be formed in the flange portion 220. The groove 224 may extend in a direction intersecting the optical axis C. The groove 224 may be formed to be open in the lateral direction of the flange portion 220. The groove 224 may be formed to have a shape that gradually narrows from the outside of the flange portion 220 to the inside thereof (in the direction of the lens barrel 200). However, the groove 224 is not necessarily formed such that the width Wr of the groove 224 becomes narrower toward the inside. For example, the width Wr of the groove 224 may be formed to have the same size in the longitudinal direction of the groove 224. The groove 224 may be formed to have a considerable length Lr. For example, the length Lr of the groove 224 may be greater than the width Wr of the groove 224.

The buffer member 402 may be fitted to the flange portion 220 of the lens barrel 200. For example, the buffer member 402 may be fitted into the groove 224 of the flange portion 220. The buffer member 402 is configured to reduce impact energy between the lens barrel 200 and the housing 100 or the shield cover 800. For example, the buffer member 402 may reduce an impact applied to the lens barrel 200 by contacting the housing 100 or the shield cover 800 prior to the lens barrel 200. The buffer member 402 may be formed of a material capable of elastic deformation. For example, the buffer member 402 may be formed of a material such as urethane foam, foamable resin, natural rubber, synthetic rubber, or a synthetic material, including the aforementioned material.

The driving assembly 500 is configured to drive the lens barrel 200. For example, the driving assembly 500 may drive the lens barrel 200 in the direction of the optical axis C to enable autofocusing (AF) of the camera module 12. The driving assembly 500 may include a driving magnet 510 and a driving coil 520. However, the shape and configuration of the driving assembly 500 are not limited to the driving magnet 510 and the driving coil 520. For example, within a range in which autofocusing of the camera module 12 is possible, the driving assembly 500 may be changed to the form of a piezoelectric element, a shape memory alloy, or the like. The driving magnet 510 may be disposed on the lens barrel 200. For example, the driving magnet 510 may be disposed on the side of the lens barrel 200 or on the side of the flange portion 220. The driving coil 520 may be disposed in a position facing the driving magnet 510. For example, the driving coil 520 may be disposed on the inner surface of the housing 100.

The shield cover 800 may be configured to cover at least a portion of the lens barrel 200. For example, the shield cover 800 may cover an upper edge of the lens barrel 200 so that the lens barrel 200 accommodated in the housing 100 is not separated externally. The shield cover 800 may be configured to protect the camera module 12 from harmful external electromagnetic waves. For example, the shield cover 800 may be formed of a metallic material or any other material suitable to block harmful external electromagnetic waves.

A protrusion 810 may be formed on the shield cover 800. For example, the protrusion 810 protruding in a direction facing the buffer member 402 may be formed on the bottom surface of the shield cover 800. The protrusion 810 may be integrally formed with the shield cover 800. For example, the protrusion 810 may be formed on the shield cover 800 through press processing. However, the method of forming the protrusion 810 is not limited to press processing. For example, the protrusion may also be formed by a method of forming a hole in the shield cover 800 and inserting a separate member into the hole.

Figure 6:
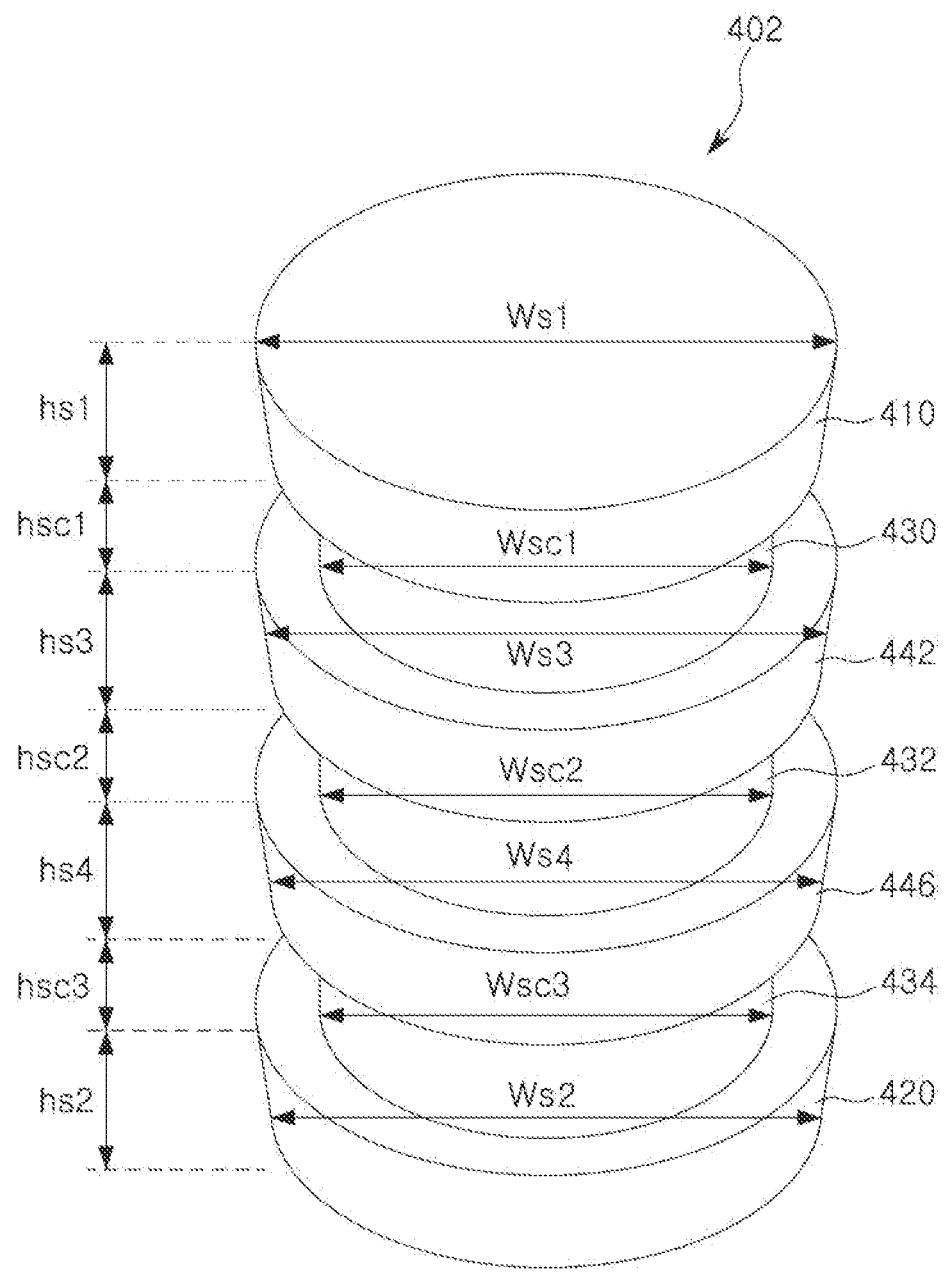
FIG. 6 is an enlarged perspective view of the buffer member illustrated in FIG. 5.

Next, the shape of the buffer member 402 will be described in detail with reference to FIG. 6.

The buffer member 402 may be formed to have a substantially cylindrical shape. In detail, the buffer member 402 may be formed to have a form in which a plurality of cylinders having different diameters are stacked in the optical axis (C) direction. The buffer member 402 may be comprised of a first buffer portion 410, a second buffer portion 420, third buffer portions 442 and 446, and connection portions 430, 432, and 434. The first buffer portion 410 may be configured to selectively contact the shield cover 800. For example, the first buffer portion 410 may be formed to protrude toward the shield cover 800 in a state in which the buffer member 402 is coupled to the flange portion 220. The second buffer portion 420 may be configured to selectively contact the step portion 110 of the housing 100. For example, the second buffer portion 420 may be formed to protrude toward the step portion 110 in a state in which the buffer member 402 is coupled to the flange portion 220. The third buffer portions 442 and 446 are configured to reduce an impact transmitted through the first buffer portion 410 or the second buffer portion 420. For example, the third buffer portions 442 and 446 may be configured to have diameters Ws3 and Ws4 and heights hs3 and hs4 different from those of the first buffer portion 410 and the second buffer portion 420, to further facilitate compression or elastic deformation than the first buffer portion 410 and the second buffer portion 420. However, the diameters Ws3 and Ws4 and heights hs3 and hs4 of the third buffer portions 442 and 446 are not necessarily configured differently from the diameters Ws1 and Ws2 and heights hs1 and hs2 of the first and second buffer portions 410 and 420. For example, the diameters Ws1, Ws2, Ws3, and Ws4 and heights hs1, hs2, hs3, and hs4 of the first buffer portion 410, the second buffer portion 420, and the third buffer portions 442 and 446 may be formed to have the same size, respectively.

The connection portions 430, 432, and 434 are configured to connect the buffer portions 410, 420, 442, and 446. For example, the first connection portion 430 may connect the first buffer portion 410 and the third buffer portion 442, the second connection portion 432 may connect the third buffer portion 442 and the third buffer portion 446, and the third connection portion 434 may connect the third buffer portion 446 and the second buffer portion 420. The connection portions 430, 432, and 434 may enable coupling between the buffer member 402 and the flange portion 220. For example, the buffer member 402 may be fitted into the groove 224 of the flange portion 220 via one of the first connection portion 430, the second connection portion 432, and the third connection portion 434. The position of the connection portions 430, 432, and 434 fitted into the groove 224 of the flange portion 220 may be changed depending on the shape of the camera module 12 or the driving type of the lens barrel 200. For example, when the space between the flange portion 220 of the lens barrel 200 and the shield cover 800 is greater than the space between the flange portion 220 of the lens barrel 200 and the housing 100, the third connection portion 434 may be fitted in the groove 224 of the flange portion 220. Differently therefrom, when the space between the flange portion 220 of the lens barrel 200 and the shield cover 800 is less than the space between the flange portion 220 of the lens barrel 200 and the housing 100, the first connection portion 430 may be fitted in the groove 224 of the flange portion 220. However, the coupling form between the buffer member 402 and the flange portion 220 is not limited to the form described above. For example, in an example in which the impact sound caused by contact between the lens barrel 200 and the shield cover 800 is relatively loud, the third connection portion 434 may be fitted into the groove 224 of the flange portion 220, such that a noise reduction effect may be expected through the first buffer portion 410 and the third buffer portions 442 and 446. On the contrary, in the case in which the impact sound caused by the contact between the lens barrel 200 and the housing 100 is loud, the first connection portion 430 may be inserted into the groove 224 of the flange portion 220, such that a noise reduction effect may be expected through the second buffer portion 420 and the third buffer portions 442 and 446.

Diameters Wsc1, Wsc2, and Wsc3 of the connection portions 430, 432, and 434 may be substantially the same as the width Wr of the groove 224. However, the diameters Wsc1, Wsc2, and Wsc3 of the connection portions 430, 432, and 434 are not necessarily the same as the width Wr of the groove 224. For example, the diameters Wsc1, Wsc2, and Wsc3 of the connection portions 430, 432, and 434 may be formed to be greater than the width Wr of the groove 224 in the range in which the elastic deformation of the buffer member 402 is possible. The buffer member 402 of the above-described shape is coupled to the groove 224 of the flange portion 220 in a force-fitting manner, and thus, the coupling force thereof with the flange portion 220 may be improved.

Heights hsc1, hsc2, and hsc3 of the connection portions 430, 432, and 434 may be greater than the height hr of the groove 224. However, the heights hsc1, hsc2, and hsc3 of the connection portions 430, 432, and 434 do not necessarily have to be greater than the height hr of the groove 224. For example, the heights hsc1, hsc2, and hsc3 of the connection portions 430, 432, and 434 may be formed to be lower than the height hr of the groove 224 within the range in which the buffer member 402 may be elastically deformed. The buffer member 402 having the above-described shape is coupled to the groove 224 of the flange portion 220 in a force-fitting manner, and thus, the coupling force thereof with the flange portion 220 may be improved.

Figure 7:
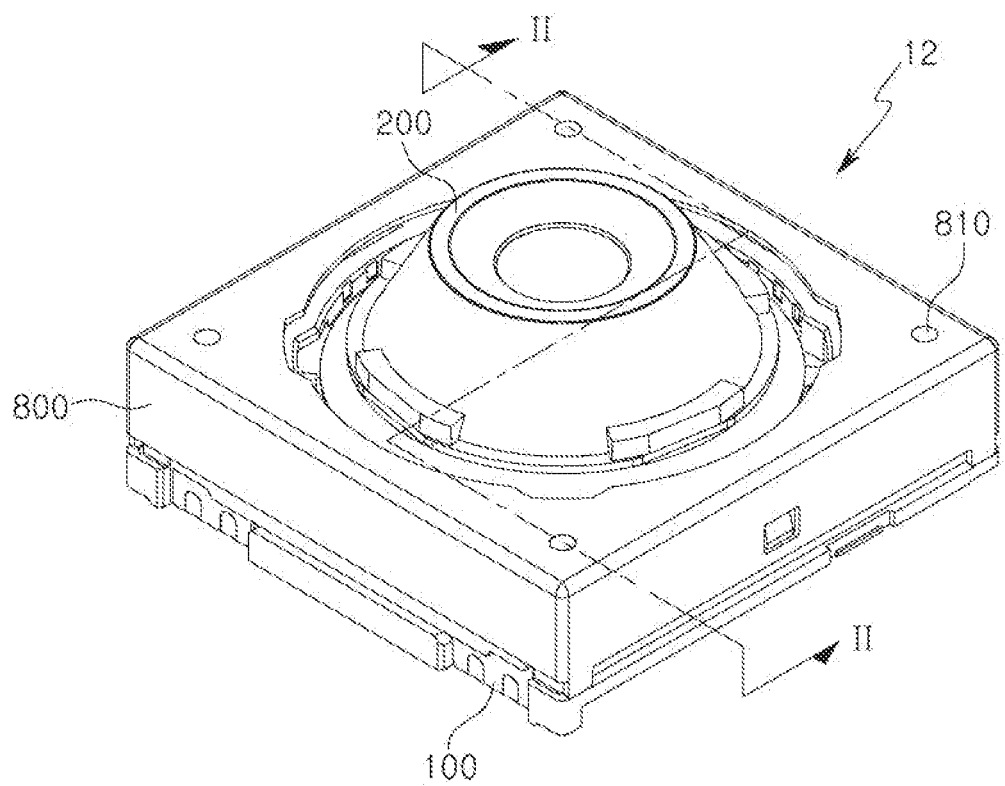
FIG. 7 is a combined perspective view of the camera module illustrated in FIG. 5.
Figure 8:
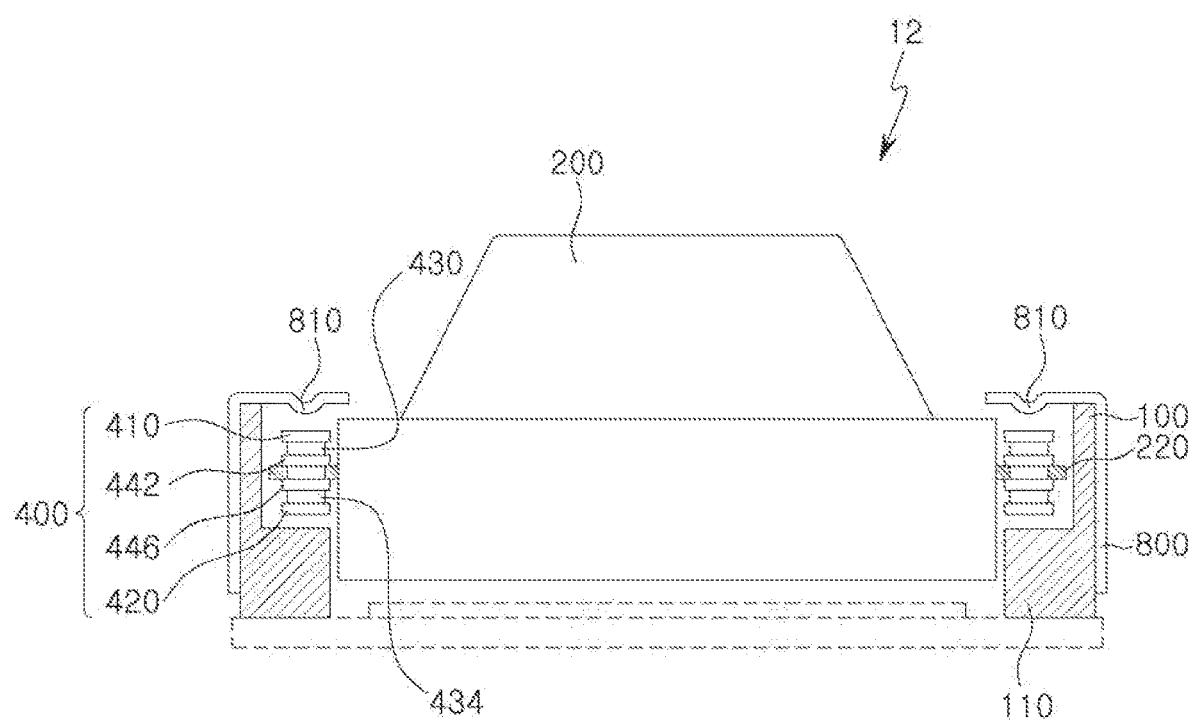
FIG. 8 is a cross-sectional view of the camera module illustrated in FIG. 7.

The camera module 12 has a small size as illustrated in FIG. 7 and thus may be mounted on a small portable terminal such as a smartphone. In addition, the camera module 12 may significantly reduce noise and impact caused by shaking of the lens barrel 200, as illustrated in FIG. 8.

For example, the camera module 12 may reduce noise and impact caused by shaking of the lens barrel 200 through the buffer member 402. The buffer member 402 may block direct contact between the lens barrel 200 and the housing 100 or the shield cover 800. For example, when the lens barrel 200 swings upwardly, the first buffer portion 410 contacts or collides with the protrusion 810 of the shield cover 800 prior to the flange portion 220 of the lens barrel 200, thereby reducing impact energy and impact sound. Similarly, when the lens barrel 200 swings downwardly, the second buffer portion 420 contacts or collides with the step portion 110 of the housing 100 before the flange portion 220 of the lens barrel 200, thereby reducing impact energy and impact sound. The camera module 12 may additionally reduce impact energy. For example, the impact energy applied to the first buffer portion 410 or the second buffer portion 420 is primarily reduced by the elastic deformation of the first buffer portion 410 or the second buffer portion 420, and then may be secondarily relieved by elastic deformation of the third buffer portions 442 and 446 and the connection portions 430 and 434. Therefore, the camera module 12 may more effectively reduce the malfunction and failure of the camera module 12 due to severe vibration of the lens barrel 200 as well as the collision sound caused by the shaking of the lens barrel 200.

Figure 9:
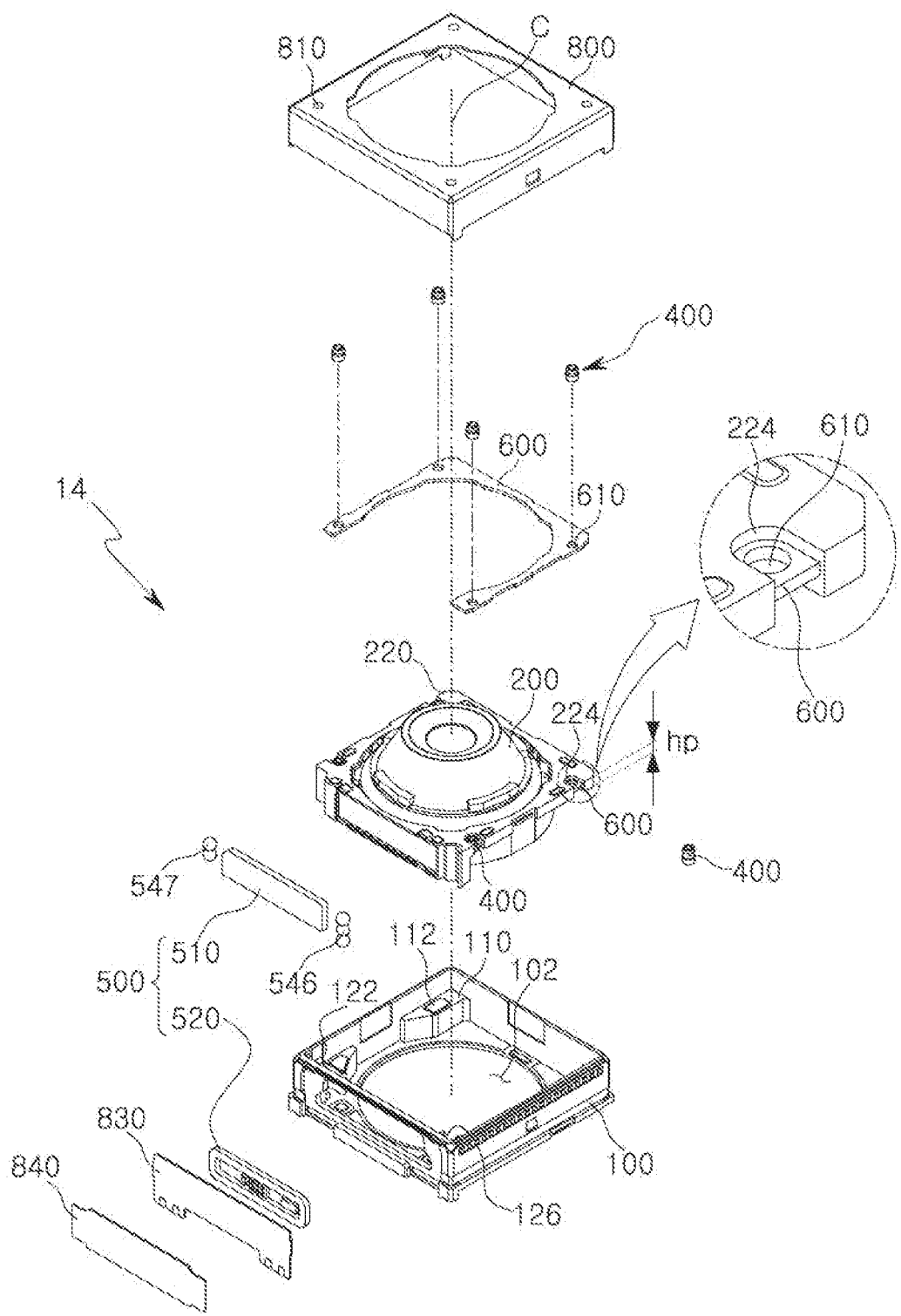
FIG. 9 is an exploded perspective view of a camera module, according to another example.

Next, a camera module according to another example will be described with reference to FIGS. 9 to 11.

A camera module 14, according to an example, may include a housing 100, a lens barrel 200, a buffer member 400, a driving assembly 500, a reinforcing member 600, and a shield cover 800. However, the configuration of the camera module 12 is not limited to the aforementioned members. For example, the camera module 12 may further include a substrate 700 and an image sensor 720 (see FIG. 11).

The housing 100 is configured to accommodate the lens barrel 200. For example, the housing 100 may be configured in a form that is open in the vertical direction and of which the side surface is closed to accommodate the lens barrel 200. A window 102 having a predetermined size may be formed in the bottom surface of the housing 100. Light refracted by the lens barrel 200 may be incident on an image sensor through the window 102 described above. A step portion 110 for selectively contacting a flange portion 220 of the lens barrel 200 may be formed in the housing 100. The step portion 110 may be formed at four corners of the housing 100 so as not to interfere with the movement of the lens barrel 200 in the optical axis C direction. However, the formation position of the step portion 110 is not limited to the corner portion of the housing 100. For example, the step portion 110 may be formed on any portion of the housing 100 in a range that does not interfere with the movement of the lens barrel 200 in the optical axis (C) direction. For example, the step portion 110 may be formed on a sidewall of the housing 100. A shock-absorbing member 112 having a predetermined elasticity may be formed on the step portion 110. For example, the shock-absorbing member 112 may be formed of a material such as urethane foam, foamable resin, natural rubber, synthetic rubber, or the like, which is easily deformable by external impacts.

The lens barrel 200 may be configured to include one or more lenses 210. For example, the lens barrel 200 may include four or more lenses 210. However, the number of lenses 210 accommodated in the lens barrel 200 is not limited to four. The lens barrel 200 may be formed to have a substantially cylindrical shape to accommodate a plurality of circular lenses 210. However, the shape of the lens barrel 200 is not limited to a cylinder. For example, the shape of the lens barrel 200 may be modified depending on the cross-sectional shape of the lens 210.

The lens barrel 200 may include the flange portion 220. For example, the flange portion 220 extending in a direction intersecting the optical axis C may be formed on a circumference of the lens barrel 200. The flange portion 220 may be formed to have substantially the same shape as the cross-sectional shape of the inner space of the housing 100. For example, the flange portion 220 may have a quadrangular shape similar to the inner space of the housing 100. A groove 224 may be formed in the flange portion 220. The groove 224 may extend in a direction intersecting the optical axis C. The groove 224 may be formed to be open in the lateral direction of the flange portion 220. The groove 224 may be formed to have a shape that gradually narrows from the outside of the flange portion 220 to the inside thereof (in the direction of the lens barrel 200). However, the groove 224 is not necessarily formed such that the width Wr of the groove 224 becomes narrower toward the inside. For example, the width Wr of the groove 224 may be formed to have the same size in the longitudinal direction of the groove 224. The groove 224 may be formed to have a considerable length Lr. For example, the length Lr of the groove 224 may be greater than the width Wr of the groove 224.

The buffer member 400 may be fitted into the flange portion 220 of the lens barrel 200. For example, the buffer member 400 may be fitted into the groove 224 of the flange portion 220. The buffer member 400 is configured to reduce impact energy between the lens barrel 200 and the housing 100 or the shield cover 800. For example, the buffer member 400 may reduce an impact applied to the lens barrel 200 by contacting the housing 100 or the shield cover 800 before the lens barrel 200. The buffer member 400 may be formed of a material capable of elastic deformation. For example, the buffer member 400 may be formed of a material such as urethane foam, foamable resin, natural rubber, synthetic rubber, or a synthetic material including the aforementioned material.

The buffer member 400 may be formed to have a substantially cylindrical shape. In detail, the buffer member 400, may be formed in a form in which a plurality of cylinders having different diameters may be stacked in the optical axis (C) direction. The buffer member 400 may include a first buffer portion 410, a second buffer portion 420, and a connection portion 430. The first buffer portion 410 may be configured to selectively contact the shield cover 800. For example, the first buffer portion 410 may be formed to protrude toward the shield cover 800 in a state in which the buffer member 400 is coupled to the flange portion 220. The second buffer portion 420 may be configured to selectively contact the step portion 110 of the housing 100. For example, the second buffer portion 420 may be formed to protrude toward the step portion 110 in a state in which the buffer member 400 is coupled to the flange portion 220. The connection portion 430 may connect the first buffer portion 410 and the second buffer portion 420.

The reinforcing member 600 may be integrally formed with the lens barrel 200. In detail, the reinforcing member 600 may be integrally formed on the flange portion 220 of the lens barrel 200. For example, the reinforcing member 600 may be formed together with the lens barrel 200 through insert injection. The reinforcing member 600 may be formed of a material different from the lens barrel 200. For example, the reinforcing member 600 may be formed of a metallic material. Accordingly, the rigidity of the lens barrel 200 may be improved by the reinforcing member 600. The reinforcing member 600 may be configured to be coupled to the buffer member 400. For example, a hole 610 into which the buffer member 400 may be inserted may be formed in the reinforcing member 600. A diameter Wh of the hole 610 may be greater than or equal to a diameter Wsc of the connection portion 430 of the buffer member 400 and may be less than diameters Ws1 and Ws2 of the buffer portions 410 and 420. A thickness t of the reinforcing member 600 may be lower than the height hp of the flange portion 220 and may be substantially the same as the height (hsc) of the connection portion 420. However, the thickness t of the reinforcing member 600 is not necessarily the same as the height hsc of the connection portion 420. For example, the thickness t of the reinforcing member 600 may be less than the height hsc of the connection portion 420. The reinforcing member 600 of the above-described shape may enable movement of the buffer member 400 inserted in the hole 610 in the optical axis direction.

The reinforcing member 600 may be integrally formed with the buffer member 400. For example, the reinforcing member 600 may be formed together with the buffer member 400 through insert injection. In addition, the reinforcing member 600 may be integrally formed with the lens barrel 200 through insert injection again after being formed together with the buffer member 400. However, the reinforcing member 600 and the buffer member 400 are not necessarily integrally formed through insert injection. For example, the buffer member 400 may be coupled to the hole 610 of the reinforcing member 600 by a force-fitting method.

The driving assembly 500 is configured to drive the lens barrel 200. For example, the driving assembly 500 may drive the lens barrel 200 in the direction of the optical axis C, to enable autofocusing (AF) of the camera module 14. The driving assembly 500 may include a driving magnet 510 and a driving coil 520. However, the shape and configuration of the driving assembly 500 are not limited to the driving magnet 510 and the driving coil 520. For example, within a range in which autofocusing of the camera module 14 is possible, the driving assembly 500 may be changed to a piezoelectric element, a shape memory alloy, or the like. The driving magnet 510 may be disposed on the lens barrel 200. For example, the driving magnet 510 may be disposed on the side of the lens barrel 200 or on the side of the flange 220. The driving coil 520 may be disposed in a position facing the driving magnet 510. For example, the driving coil 520 may be disposed on the inner surface of the housing 100.

The shield cover 800 may be configured to cover at least a portion of the lens barrel 200. For example, the shield cover 800 may cover an upper edge of the lens barrel 200 so that the lens barrel 200 accommodated in the housing 100 is not separated externally. The shield cover 800 may be configured to protect the camera module 14 from external harmful electromagnetic waves. For example, the shield cover 800 may be formed of a metallic material or any other material suitable to block harmful electromagnetic waves.

A protrusion 810 may be formed on the shield cover 800. For example, the protrusion 810 protruding in a direction facing the buffer member 400 may be formed on the bottom surface of the shield cover 800. The protrusion 810 may be integrally formed with the shield cover 800. For example, the protrusion 810 may be formed on the shield cover 800 through press processing. However, the method of forming the protrusion 810 is not limited to press processing. For example, the protrusion may be formed by a method of forming a hole in the shield cover 800 and inserting a separate member into the hole.

Figure 10:
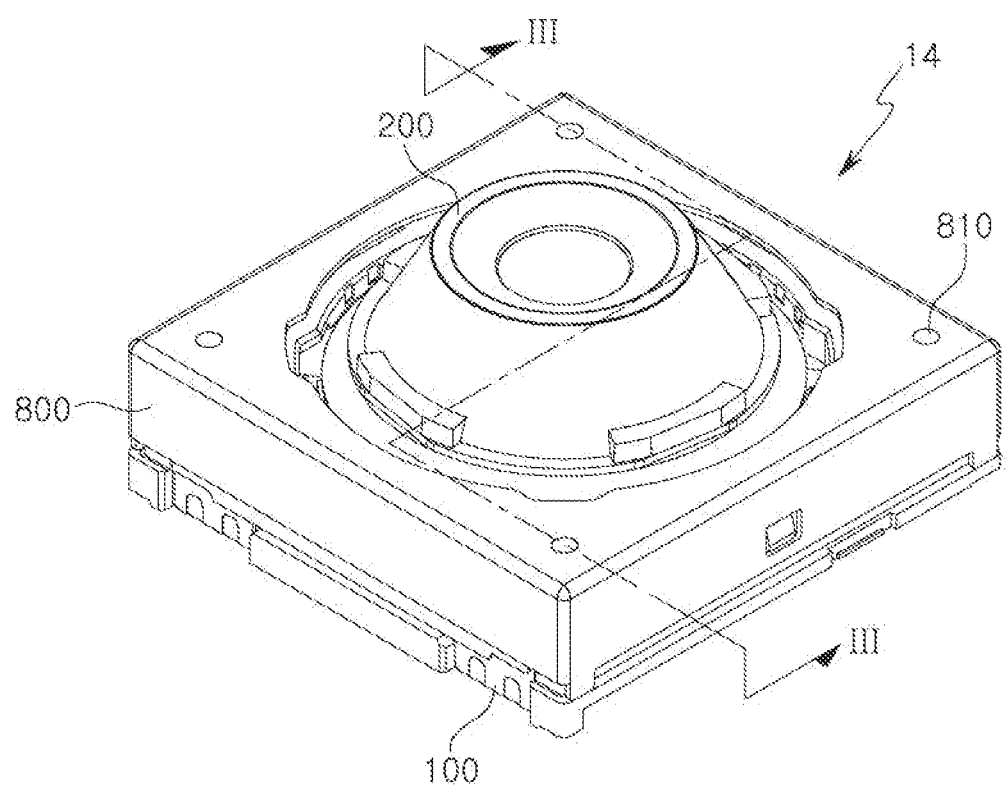
FIG. 10 is a combined perspective view of the camera module illustrated in FIG. 9.
Figure 11:
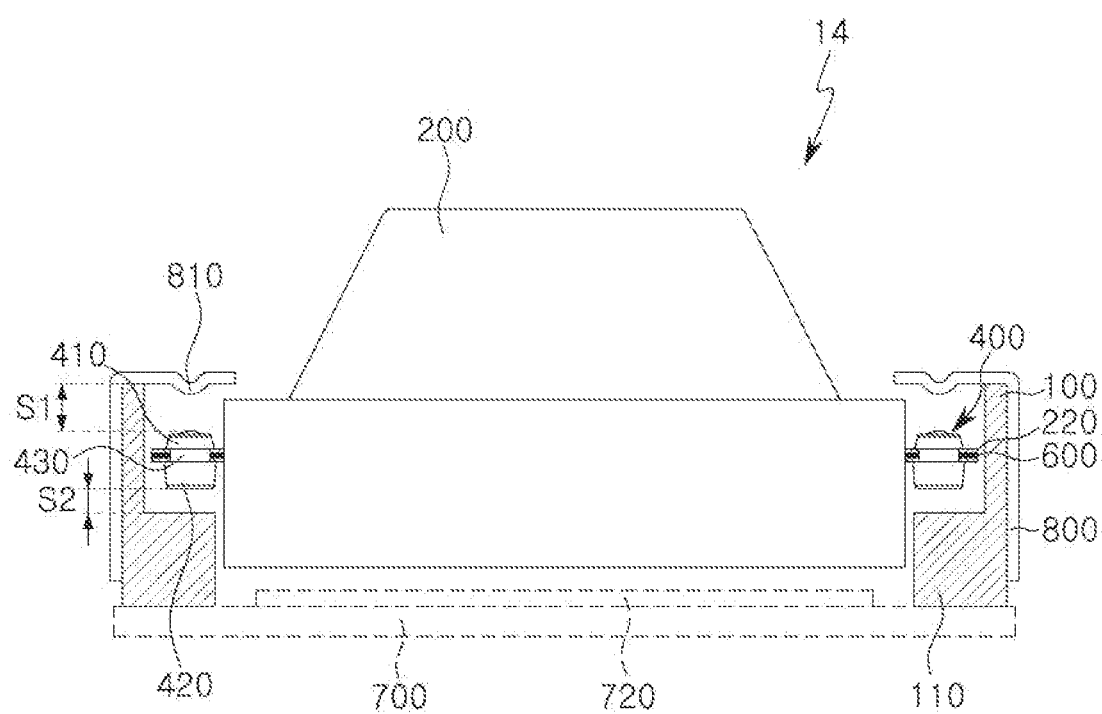
FIG. 11 is a cross-sectional view of the camera module illustrated in FIG. 10.

The camera module 14 has a small size, as illustrated in FIG. 10, and thus may be mounted on a small portable terminal such as a smartphone. In addition, the camera module 14 may significantly reduce noise and impact caused by shaking of the lens barrel 200, as illustrated in FIG. 11. For example, the camera module 14 may reduce noise and impact caused by shaking of the lens barrel 200 through the buffer member 400. The buffer member 400 may block direct contact between the lens barrel 200 and the housing 100 or the shield cover 800. For example, when the lens barrel 200 swings upwardly, the first buffer portion 410 contacts and collides with the protrusion 810 of the shield cover 800 before the flange portion 220 of the lens barrel 200, thereby reducing impact energy and impact sound. Similarly, when the lens barrel 200 swings downwardly, the second buffer portion 420 contacts and collides with the step portion 110 of the housing 100 before the flange portion 220 of the lens barrel 200, thereby reducing impact energy and impact sound. The camera module 14 may improve the binding force between the lens barrel 200 and the buffer member 400 through the reinforcing member 600. For reference, the buffer member 400 is illustrated in FIGS. 9 to 11 may be changed to the shape of the buffer member 402 illustrated in FIGS. 5 to 8.

Figure 12:
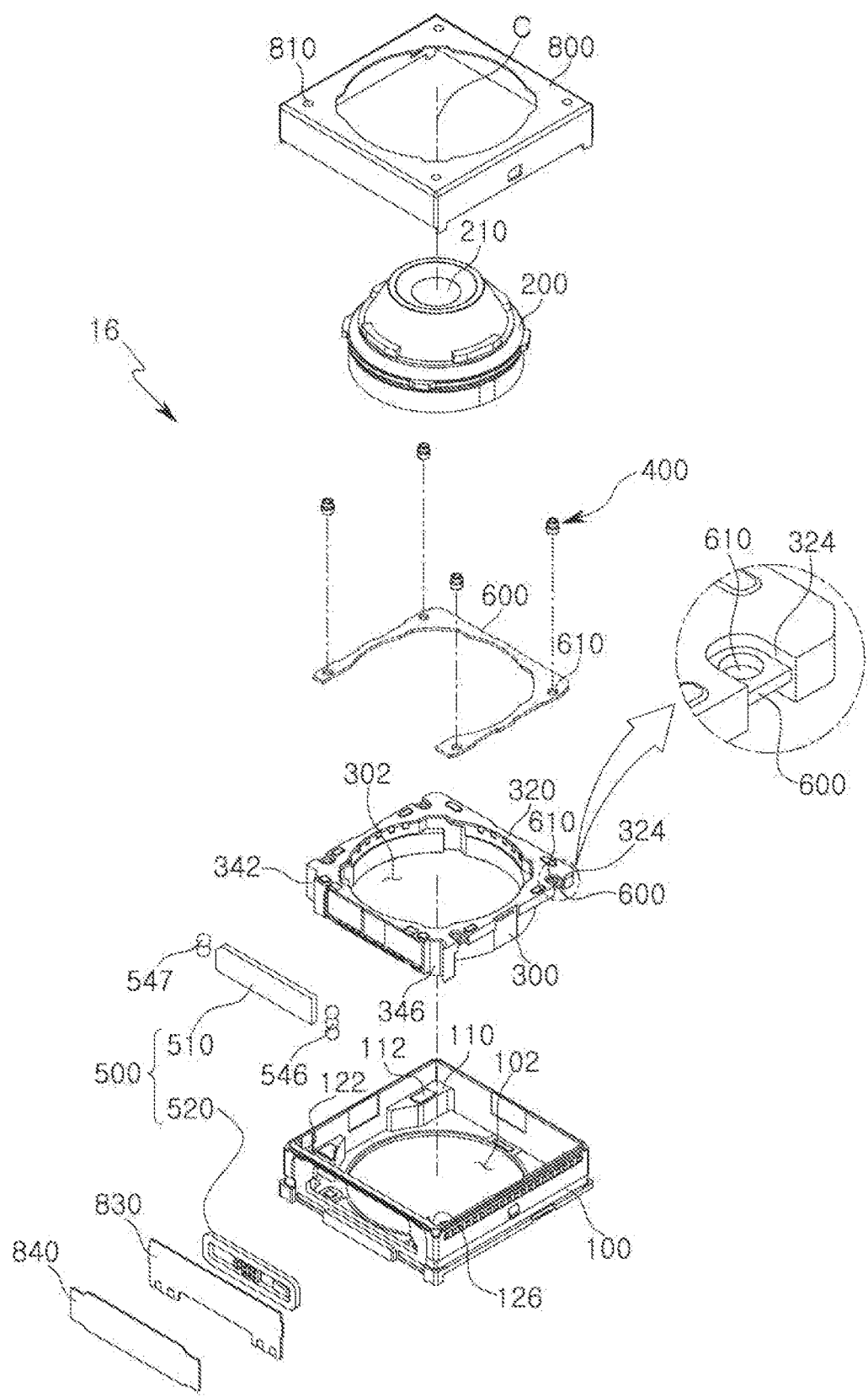
FIG. 12 is an exploded perspective view of a camera module, according to another example.

Next, a camera module according to another example will be described with reference to FIGS. 12 to 14.

A camera module 16, according to an example, may include a housing 100, a lens barrel 200, a barrel holder 300, a buffer member 400, a driving assembly 500, a reinforcing member 600, and a shield cover 800. However, the configuration of the camera module 16 is not limited to the aforementioned members. For example, the camera module 16 may further include a flexible substrate 830, a yoke 840, and ball bearings 547 and 546. Additionally, the camera module 16 may further include a substrate 700 and an image sensor 720 (see FIG. 14).

The housing 100 is configured to accommodate the lens barrel 200. For example, the housing 100 may be configured in a form that is open in the vertical direction and of which the side surface is closed to accommodate the lens barrel 200. A window 102 having a predetermined size may be formed in the bottom surface of the housing 100. Light refracted by the lens barrel 200 may be incident on the image sensor through the window 102 described above. A step portion 110 for selectively contacting the flange portion 220 of the lens barrel 200 may be formed in the housing 100. The step portion 110 may be formed at four corners of the housing 100 so as not to interfere with the movement of the lens barrel 200 in the optical axis C direction. However, the formation position of the step portion 110 is not limited to the corner portion of the housing 100. For example, the step portion 110 may be formed on any portion of the housing 100 in a range that does not interfere with the movement of the lens barrel 200 in the optical axis (C) direction. For example, the step portion 110 may be formed on a sidewall of the housing 100. A shock-absorbing member 112 having a predetermined elasticity may be formed on the step portion 110. For example, the shock-absorbing member 112 may be formed of a material such as urethane foam, foamable resin, natural rubber, synthetic rubber, or the like, which is easily deformable by external impacts.

The lens barrel 200 may be configured to include one or more lenses 210. For example, the lens barrel 200 may include four or more lenses 210. However, the number of lenses 210 accommodated in the lens barrel 200 is not limited to four. The lens barrel 200 may be formed to have a substantially cylindrical shape to accommodate a plurality of circular lenses 210. However, the shape of the lens barrel 200 is not limited to a cylinder. For example, the shape of the lens barrel 200 may be modified depending on the cross-sectional shape of the lens 210.

The barrel holder 300 is configured to be coupled to the lens barrel 200. For example, the lens barrel 200 may be fitted in an accommodation space 302 of the barrel holder 300. Permanent coupling between the barrel holder 300 and the lens barrel 200 may be obtained through a bonding agent. However, the combination of the barrel holder 300 and the lens barrel 200 is not necessarily performed only through a bonding agent. For example, the barrel holder 300 and the lens barrel 200 may be coupled by screwing or force-fitting. The barrel holder 300 may include a flange portion 320. The flange portion 320 may be formed to have substantially the same shape as the inner cross-section of the housing 100. A groove 324 may be formed in the flange portion 320. The groove 324 may be formed to have a shape open in the vertical direction and the outer direction of the flange portion 320. The buffer member 400 may be disposed in the groove 324. The reinforcing member 600 integrally formed with the barrel holder 300 may be exposed externally through the groove 324.

The buffer member 400 may be fitted into the flange portion 220 of the lens barrel 200. For example, the buffer member 400 may be fitted into the groove 224 of the flange portion 220. The buffer member 400 is configured to reduce impact energy between the lens barrel 200 and the housing 100 or the shield cover 800. For example, the buffer member 400 may reduce an impact applied to the lens barrel 200 by contacting the housing 100 or the shield cover 800 before the lens barrel 200. The buffer member 400 may be formed of a material capable of elastic deformation. For example, the buffer member 400 may be formed of a material such as urethane foam, foamable resin, natural rubber, synthetic rubber, or a synthetic material including the aforementioned material.

The buffer member 400 may be formed to have a substantially cylindrical shape. In detail, the buffer member 400 may be formed in a form in which a plurality of cylinders having different diameters may be stacked in the optical axis (C) direction. The buffer member 400 may include a first buffer portion 410, a second buffer portion 420, and a connection portion 430. The first buffer portion 410 may be configured to selectively contact the shield cover 800. For example, the first buffer portion 410 may be formed to protrude toward the shield cover 800 in a state in which the buffer member 400 is coupled to the flange portion 220. The second buffer portion 420 may be configured to selectively contact the step portion 110 of the housing 100. For example, the second buffer portion 420 may be formed to protrude toward the step portion 110 in a state in which the buffer member 400 is coupled to the flange portion 220. The connection portion 430 may connect the first buffer portion 410 and the second buffer portion 420.

The reinforcing member 600 may be integrally formed with the barrel holder 300. In detail, the reinforcing member 600 may be integrally formed on the flange portion 320 of the barrel holder 300. For example, the reinforcing member 600 may be formed together with the barrel holder 300 through insert injection. The reinforcing member 600 may be formed of a material different from that of the barrel holder 300. For example, the reinforcing member 600 may be formed of a metallic material. Accordingly, the rigidity of the barrel holder 300 may be improved by the reinforcing member 600. The reinforcing member 600 may be configured to be coupled to the buffer member 400. For example, a hole 610 into which the buffer member 400 may be inserted may be formed in the reinforcing member 600. The diameter Wh of the hole 610 may be greater than or equal to the diameter Wsc of the connection portion 430 of the buffer member 400 and may be less than the diameters Ws1 and Ws2 of the buffer portions 410 and 420. The thickness t of the reinforcing member 600 may be less than the height hp of the flange portion 320 and may be substantially the same as the height hsc of the connection portion 420. However, the thickness t of the reinforcing member 600 is not necessarily the same as the height hsc of the connection portion 420. For example, the thickness t of the reinforcing member 600 may be less than the height hsc of the connection portion 420. The reinforcing member 600 of the above-described shape may enable movement of the buffer member 400 inserted in the hole 610 in the optical axis direction.

The reinforcing member 600 may be integrally formed with the buffer member 400. For example, the reinforcing member 600 may be formed together with the buffer member 400 through insert injection. In addition, the reinforcing member 600 may be integrally formed with the barrel holder 300 through insert injection after being formed together with the buffer member 400. However, the reinforcing member 600 and the buffer member 400 are not necessarily integrally formed through insert injection. For example, the buffer member 400 may be coupled to the hole 610 of the reinforcing member 600 by a force-fitting method.

The driving assembly 500 is configured to drive the lens barrel 200. For example, the driving assembly 500 may drive the lens barrel 200 in the direction of the optical axis C to enable autofocusing (AF) of the camera module 16. The driving assembly 500 may include a driving magnet 510 and a driving coil 520. However, the shape and configuration of the driving assembly 500 are not limited to the driving magnet 510 and the driving coil 520. For example, within a range in which autofocusing of the camera module 16 is possible, the driving assembly 500 may be changed to a piezoelectric element, a shape memory alloy, or the like. The driving magnet 510 may be disposed on the barrel holder 300. For example, the driving magnet 510 may be disposed on the side of the barrel holder 300 or on the side of the flange 320. The driving coil 520 may be disposed in a position facing the driving magnet 200. For example, the driving coil 520 may be disposed on the open side of the housing 100 via the flexible substrate 830.

The camera module 16 may further include ball bearings 547 and 546 to smoothly move the lens barrel 200 and the barrel holder 300 in the optical axis (C) direction. The ball bearings 547 and 546 may be disposed between the housing 100 and the barrel holder 300. In detail, the ball bearings 547 and 546 may be disposed between guide grooves 122 and 126 of the housing 100 and guide grooves 342 and 346 of the barrel holder 300. The ball bearings 547 and 546 may be disposed in a left and right asymmetric shape with respect to the optical axis C. For example, two ball bearings 547 may be disposed in the guide grooves 122 and 342, and three ball bearings 546 may be disposed in the guide grooves 126 and 346. However, if necessary, the same number of ball bearings may be disposed in the guide grooves 122 and 342, and the guide grooves 126 and 346. In addition, ball bearings having different sizes may be disposed in the guide grooves 122 and 342 and the guide grooves 126 and 346 to prevent the lens barrel 200 and the barrel holder 300 from tilting.

The shield cover 800 may be configured to cover at least a portion of the lens barrel 200. For example, the shield cover 800 may cover an upper edge of the lens barrel 200, such that the lens barrel 200 accommodated in the housing 100 is not separated externally. The shield cover 800 may be configured to protect the camera module 16 from external harmful electromagnetic waves. For example, the shield cover 800 may be formed of a metallic material or any other material suitable to block harmful electromagnetic waves.

A protrusion 810 may be formed on the shield cover 800. For example, the protrusion 810 protruding in a direction facing the buffer member 400 may be formed on the bottom surface of the shield cover 800. The protrusion 810 may be integrally formed with the shield cover 800. For example, the protrusion 810 may be formed on the shield cover 800 through press processing. However, the method of forming the protrusion 810 is not limited to press processing. For example, the protrusion may be formed using a method of forming a hole in the shield cover 800 and inserting a separate member into the hole.

Figure 13:
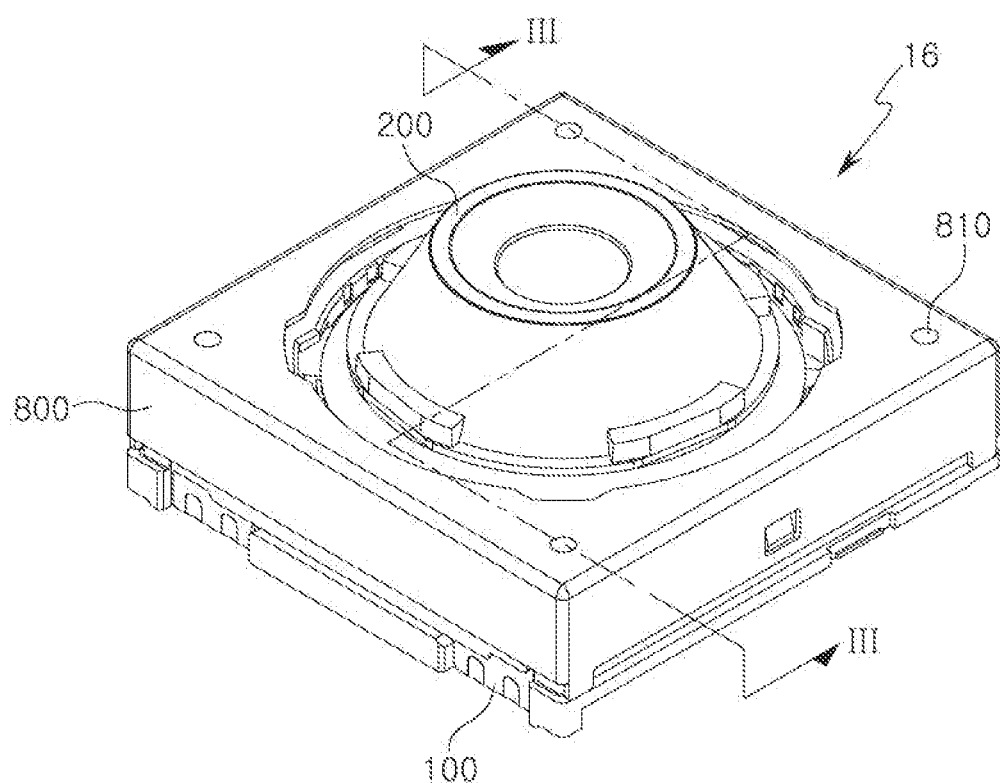
FIG. 13 is a perspective view illustrating the camera module illustrated in FIG. 12.
Figure 14:
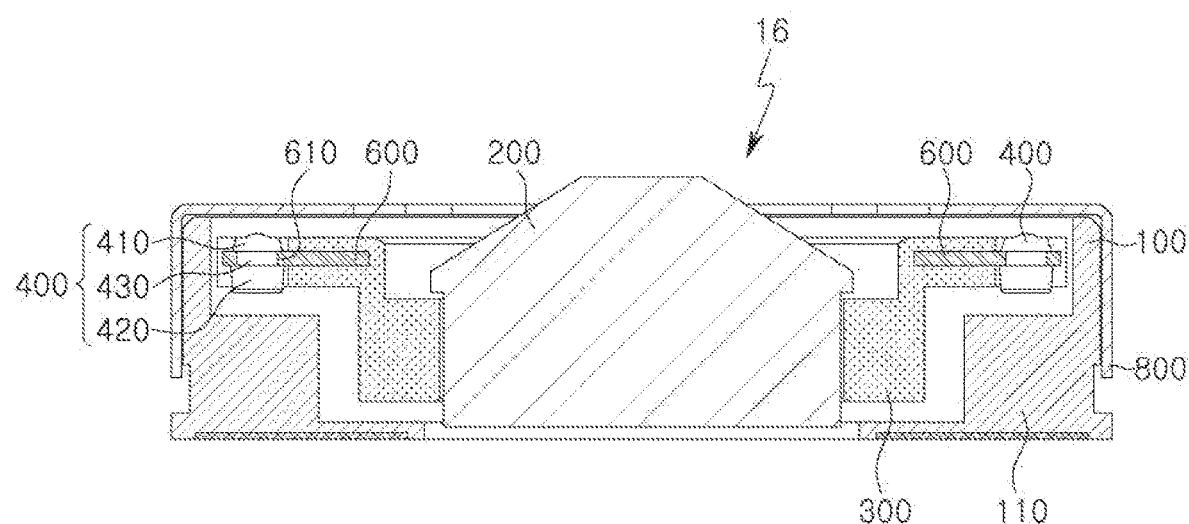
FIG. 14 is a cross-sectional view of the camera module illustrated in FIG. 13.

The camera module 16 has a small size, as illustrated in FIG. 13, and thus, may be mounted on a small portable terminal such as a smartphone. In addition, the camera module 16 may significantly reduce noise and impact caused by shaking of the lens barrel 200, as illustrated in FIG. 14. In addition, the camera module 16 may improve the binding force between the barrel holder 300 and the buffer member 400.

As set forth above, noise caused by the movement of a lens module may be reduced.

In addition, malfunctioning and damage to a camera module caused by collisions between a lens module and other members may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
    a lens barrel including a flange portion extending in a direction intersecting an optical axis;
    a housing configured to accommodate the lens barrel and having a step portion configured to face a lower portion of the flange portion;
    a shield cover coupled to the housing and configured to cover an upper edge of the lens barrel; and
    a buffer member configured to couple to a groove of the flange portion and protrude in opposing directions from the flange portion to selectively contact the shield cover and the step portion,
    wherein the buffer member comprises:
    a first buffer portion configured to contact the shield cover;
    a second buffer portion configured to contact the step portion; and
    a connection portion disposed between the first buffer portion and the second buffer portion and configured to fit into the groove.

2. The camera module of claim 1, wherein the shield cover includes a protrusion extending towards the buffer member.

3. The camera module of claim 1, further comprising a driving assembly configured to drive the lens barrel in the optical axis direction.

4. The camera module of claim 3, wherein the driving assembly comprises:
    a driving magnet disposed on the lens barrel; and
    a driving coil disposed in the housing.

5. The camera module of claim 1, further comprising a reinforcing member integrally configured with the flange portion and having a hole into which the buffer member is to be inserted.

6. The camera module of claim 5, wherein the reinforcing member is formed of a material different from a material of the lens barrel.

7. The camera module of claim 1, wherein the shield cover is formed of metal.

8. A camera module comprising:
    a lens barrel configured to receive a lens;
    a barrel holder coupled to the lens barrel and including a flange portion extending to intersect an optical axis;
    a housing, configured to accommodate the lens barrel and the barrel holder, provided with a step portion configured to face the flange portion;
    a shield cover coupled to the housing and configured to cover an upper edge of the lens barrel; and
    a buffer member fitted into a groove of the flange portion and configured to contact the step portion or the shield cover,
    wherein the buffer member comprises:
    a first buffer portion configured to contact the shield cover;
    a second buffer portion configured to contact the step portion; and
    a connection portion disposed between the first buffer portion and the second buffer portion and configured to fit into the groove.

9. The camera module of claim 8, further comprising a driving assembly configured to drive the lens barrel and the barrel holder in the optical axis direction.

10. The camera module of claim 9, wherein the driving assembly comprises:
a driving magnet disposed on the barrel holder; and
a driving coil disposed in the housing.

11. The camera module of claim 10, further comprising a guide groove of the lens barrel and a guide groove of the housing provided with a ball bearing disposed therebetween.

12. The camera module of claim 8, wherein the shield cover comprises a protrusion protruding towards the buffer member.

13. The camera module of claim 8, wherein the flange portion is provided with a reinforcing member integrally configured with the flange portion and has a hole into which the buffer member is to be inserted.

14. The camera module of claim 13, wherein the reinforcing member is formed of a material different from a material of the barrel holder.

15. The camera module of claim 8, wherein the shield cover is formed of metal.

16. A camera module comprising:
a lens barrel including a flange portion extending in a direction intersecting an optical axis;
a housing configured to accommodate the lens barrel and having a step portion configured to face a lower portion of the flange portion;
a shield cover coupled to the housing and configured to cover an upper edge of the lens barrel; and
a buffer member configured to couple to the flange portion and protrude in opposing directions from the flange portion to selectively contact the shield cover and the step portion,
wherein the buffer member comprises:
a first buffer portion configured to contact the shield cover;
a second buffer portion configured to contact the step portion; and
a connection portion disposed between the first buffer portion and the second buffer portion.

* * * * *